(12) United States Patent
Sparks et al.

(10) Patent No.: US 11,112,040 B2
(45) Date of Patent: Sep. 7, 2021

(54) INTERNAL SPOKE GIMBAL JOINT

(71) Applicant: The Boeing Company, Chicago, IL (US)

(72) Inventors: Michael Stephen Sparks, Union Grove, AL (US); Verbon Blake Sparks, Grant, AL (US)

(73) Assignee: The Boeing Company, Chicago, IL (US)

( * ) Notice: Subject to any disclaimer, the term of this patent is extended or adjusted under 35 U.S.C. 154(b) by 132 days.

(21) Appl. No.: 16/052,468

(22) Filed: Aug. 1, 2018

(65) Prior Publication Data

US 2020/0041050 A1 Feb. 6, 2020

(51) Int. Cl.
*F16L 27/02* (2006.01)
*F16L 27/06* (2006.01)
*F02K 9/44* (2006.01)

(52) U.S. Cl.
CPC ............ *F16L 27/06* (2013.01); *F02K 9/44* (2013.01); *F16L 27/02* (2013.01)

(58) Field of Classification Search
CPC .......... F16L 27/02; F16L 27/11; F16L 27/111; F16L 27/0857; F16L 27/0853
USPC ........................................ 285/226, 227, 228
See application file for complete search history.

(56) References Cited

U.S. PATENT DOCUMENTS

| | | | | |
|---|---|---|---|---|
| 2,824,758 A * | 2/1958 | Cattrell | ............... | F16L 27/067 285/187 |
| 2,901,272 A * | 8/1959 | Andersen | ............... | F16L 27/111 285/227 |
| 2,904,356 A * | 9/1959 | Love | ............... | F16L 27/0857 285/226 |
| 2,921,803 A * | 1/1960 | Tracy | ............... | F16L 27/04 285/262 |
| 2,936,185 A * | 5/1960 | Olsen | ............... | F16L 27/0857 285/226 |
| 3,112,129 A * | 11/1963 | Willis | ............... | F16L 27/0857 285/226 |
| 3,353,846 A * | 11/1967 | Peyton | ............... | F16L 27/11 285/16 |
| 3,551,010 A * | 12/1970 | Halling | ............... | F16L 27/0857 285/226 |
| 4,480,857 A * | 11/1984 | Graves | ............... | F16L 27/0857 285/226 |
| 4,643,463 A * | 2/1987 | Hailing | ............... | F16L 27/0857 285/226 |
| 4,645,244 A * | 2/1987 | Curtis | ............... | F16L 27/0857 285/114 |
| 4,652,025 A * | 3/1987 | Conroy, Sr. | ......... | F16L 27/0857 285/114 |

(Continued)

OTHER PUBLICATIONS

ARP735, S. A. E. "Aerospace Vehicle Cryogenic Ducting Systems", 1966, pp. 77-78.

(Continued)

*Primary Examiner* — David Bochna
(74) *Attorney, Agent, or Firm* — Kolisch Hartwell, P.C.

(57) ABSTRACT

A gimbal apparatus is disclosed, including a tubular envelope with a variable length between first and second rim structures. A rigid ring structure inside the tubular envelope is connected to diametrically opposite first and second portions of the first rim structure, and is connected to diametrically opposite first and second portions of the second rim structure. A spoke bisects the ring structure.

20 Claims, 6 Drawing Sheets

(56) References Cited

U.S. PATENT DOCUMENTS

| | | | | |
|---|---|---|---|---|
| 4,746,148 | A | * | 5/1988 | Perkins .................. F16L 27/111 |
| | | | | 285/114 |
| 5,112,088 | A | * | 5/1992 | Moore ................ F16L 27/0857 |
| | | | | 285/114 |
| 7,040,666 | B2 | * | 5/2006 | Christianson ....... F16L 27/0857 |
| | | | | 285/145.5 |
| 7,677,606 | B2 | * | 3/2010 | Rohwedder ............. F16L 27/11 |
| | | | | 285/226 |
| 10,036,498 | B2 | * | 7/2018 | Tabb .................. F16L 27/0857 |
| 2017/0167649 | A1 | * | 6/2017 | Tabb .................. F16L 27/0812 |

OTHER PUBLICATIONS

Trainer et al., "Final Report on the Development of Analytical Techniques for Bellows and Diaphragm Design" AFRPL Report No. TR (1968): 68-22. p. 6.
Huzel et al., Modern engineering for design of liquid-propellant rocket engines. vol. 147. AiAA, 1992, p. 327.

* cited by examiner

INTERNAL SPOKE GIMBAL JOINT

FEDERALLY SPONSORED RESEARCH OR DEVELOPMENT

The invention described herein was made in the performance of work under NASA Contract No. NNM07AB03C and is subject to the provisions of Section 305 of the National Aeronautics and Space Act of 1958 (72 Stat.435: 42U.S.C.2457).

FIELD

This disclosure relates to systems and methods for directing fluid flow. More specifically, the disclosed embodiments relate to gimbal expansion joints.

INTRODUCTION

Piping and ducting systems that carry fluid at a pressure greater or lesser than atmospheric pressure must account for pressure thrust. This force, equal to the fluid pressure multiplied by the effective cross-sectional area of a conduit, may influence the system design and require use of expansion joints, anchors, guides and/or other hardware.

Different types of expansion joints are used according to a desired movement of the joint. One type is a gimbal expansion joint, which is typically designed to absorb the full pressure thrust load while allowing deflection or angular rotation in any plane. A gimbal expansion joint typically includes a gimbal ring, either external or internal to a bellows. All loads are transferred in bending through the ring, requiring a massive ring and large bellows envelope.

An internally linked assembly is a lighter expansion joint allowing similar movement. Loads are transferred by multiple spokes fixed inside a bellows, linked together by a tie-rod or ball and socket joint. However, the typically six or more spokes obstruct fluid flow and require individual weld joins. Additionally, the bellows is the only load path for torsion.

Therefore, an expansion joint with minimized mass, simple construction, and effective load transfer that can still absorb full pressure thrust load and allow angular rotation in any plane is desirable.

SUMMARY

The present disclosure provides systems, apparatus, and methods relating to a gimbal apparatus. In some embodiments, a gimbal apparatus may include a tubular envelope with a variable length between first and second rim structures. The apparatus may further include a rigid ring structure inside the tubular envelope. The ring structure may be connected to diametrically opposite first and second portions of the first rim structure, and connected to diametrically opposite first and second portions of the second rim structure. A spoke may bisect the ring structure.

In some embodiments, a gimbal joint may include a flexible envelope portion with a first and second end, configured to direct a flow of fluid. A first rim may be fixed to the first end of the envelope portion and a second rim may be fixed to the second end of the envelope portion. The gimbal joint may further include a gimbal structure with a ring and a spoke that bisects the ring. The ring may be rotatably coupled to the first rim by first and second opposing fasteners, and may be rotatably coupled to the second rim by third and fourth opposing fasteners.

In some embodiments, a feedline for an engine may include a conduit with a joint. The joint may include a tubular envelope that has variable length between first and second rim structures. The joint may further include a rigid ring structure inside the tubular envelope. The ring structure may be connected to the first and second rim structures and may include a plurality of spokes.

Features, functions, and advantages may be achieved independently in various embodiments of the present disclosure, or may be combined in yet other embodiments, further details of which can be seen with reference to the following description and drawings.

DETAILED DESCRIPTION

Various aspects and examples of an expansion joint having a gimbal structure, as well as related methods, are described below and illustrated in the associated drawings.

Unless otherwise specified, a gimbal joint in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through C, each of which is labeled accordingly.

Overview

Figure 1:
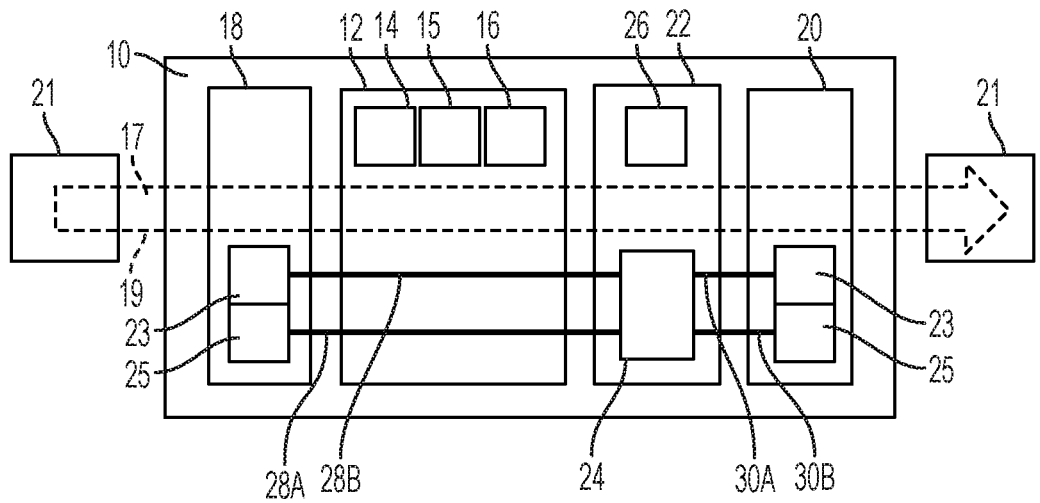
FIG. 1 is a schematic diagram of an illustrative gimbal joint as described herein.

In general, a gimbal expansion joint in accordance with the present teachings may include a tubular envelope portion between first and second rims, and a rigid gimbal ring structure pivotably mounted to the first and second rims. FIG. 1 is a schematic diagram depicting an illustrative gimbal joint 10, including envelope portion 12.

Envelope portion 12 includes a first end 14 and a second end 16, and has a variable length 15 between the first and second end. The envelope portion may be configured for flexion and/or expansion along length 15, and may include flexible structures such as a metal bellows, fabric belt, and/or neoprene expander. The envelope portion may include multiple layers and/or structures. For example, a bellows may include multiple plies of metal lined with a non-reactive coating.

Envelope portion 12 may be tubular, and configured to direct a flow of fluid 17 along an adjustable flow path 19. For example, the envelope may direct exhaust air, hot water, liquid oxygen, or any selected fluid. The envelope may be of sufficient strength to maintain fluid pressure and may be of an appropriate flexibility to absorb pressure thrust loads. The envelope portion may comprise a material appropriate to the directed fluid.

A first rim 18 is fixed to envelope portion 12 proximate first end 14, and a second rim 20 is fixed to the envelope portion proximate second end 16. Each rim 18, 20 is configured for connection to a fluid conduit 21. For example, each rim may include a planar surface appropriate for the welding of a metal pipe. Alternatively, one or both rims may include a threaded section, a cylindrical section appropriate to mate with a union joint, and/or any structure appropriate for connection with a conduit.

First rim 18 and second rim 20 are also configured for rotatable and/or pivotable connection to a rigid gimbal structure 22. Each rim includes a first portion 23 and diametrically opposed second portion 25, with the first and second portions being connected to gimbal structure 22. For example, each rim may include a pair of opposing tabs with apertures sized to receive a fastener. Alternatively, each rim may include a cylindrical section having multiple apertures, rotatably coupled bolts, and/or any structure facilitating a connection with gimbal structure 22 that provides the desired rotational freedom.

Each rim 18, 20 may be shaped to minimize obstruction of fluid flow 17, and/or define a desired fluid flow path 19 through gimbal joint 10. Envelope portion 12 may have an interior volume with an inner surface. Each rim may be disposed partially outside the interior volume of the envelope portion and partially inside the interior volume. Those structures of a rim that are disposed inside the interior volume of the envelope portion may be adjacent the inner surface of the interior volume and may be shaped to conform closely to the inner surface.

For instance, each rim 18, 20 may be primarily cylindrical in shape, with two tabs extending into envelope portion 12. The tabs may be curved, matching a curve of an interior surface of the envelope portion. Alternatively, the tabs may be narrow and planar, lying approximately tangent to the curve of the interior surface.

Gimbal structure 22 may also be shaped to minimize obstruction of fluid flow 17 along flow path 19, through gimbal joint 10. The gimbal structure includes a ring 24 and one or more spokes 26, and is disposed entirely within envelope portion 12. Ring 24 may be circular and/or may be shaped to match an interior volume of envelope portion 12.

Spokes 26 may be shaped and/or disposed to provide structural strength to gimbal structure 22. For example, a spoke may bisect ring 24 and extend between two connections of gimbal structure 22 to first rim 18. That is, the spoke may extend between points on ring 24 proximate first and second portions 23, 25 of first rim 18. In some examples, spokes 26 may include a plurality of spokes. In some examples, gimbal structure 22 may include additional and/or other reinforcing structures.

Each of first rim 18, second rim 20, and gimbal structure 22 may be shaped to minimize a volume of material and thereby minimize weight. The components may include cut-outs, tapering, and/or other weight reducing shapes. The components may include only a volume of material necessary to achieve desired properties such as a structural strength required for an intended operational pressure and/or other operating condition.

Gimbal structure 22 is connected to first rim 18 and to second rim 20. The gimbal structure connects first rim 18 to second rim 20, such that each rim may rotate and/or pivot relative to the other, but may not move away from the other rim. In other words, gimbal structure 22 is connected to first rim 18 such that first rim 18 is able to rotate about a first rotational axis, but cannot move relative to the gimbal structure along a central axis of the gimbal structure. Similarly, the gimbal structure is connected to second rim 20 such that second rim 20 is able to rotate about a second axis, but cannot move relative to the gimbal structure along the central axis.

Therefore, first rim 18 may rotate relative to second rim 20 about the first and second rotational axes, but is prevented from moving relative to second rim 20 along the central axis. Equivalently, second rim 20 may rotate relative to first rim 18 about the first and second rotational axes, but is prevented from moving relative to first rim 18 along the central axis. Envelope portion 12 may flex to accommodate the rotational motion. That is, one side of envelope portion 12 may expand, and an opposing side of the envelope portion may contract.

In the present example, gimbal structure 22 is connected to first rim 18 by two fasteners 28A, 28B. The gimbal structure is also connected to second rim 20 by two fasteners 30A, 30B. Fasteners 28A and 28B may be disposed opposite each other, and may cooperatively define the first rotation axis. Fasteners 30A and 30B may be disposed opposite each other, and may cooperatively define the second rotation axis. The fasteners may be disposed such that the first and second rotational axes are orthogonal. In some examples, two or more of the fasteners may be part of a single structure. For example, fasteners 28A and 28B may be first and second threaded ends of a rod extending through gimbal structure 22.

Gimbal 10 may be described as configured to connect to two or more fluid conduits, and/or as forming part of a conduit. When gimbal joint 10 connects two conduit sections or fluid conduits 21, the gimbal joint may allow each of the fluid conduits to angulate in two planes relative to the other fluid conduit, where the two planes are defined by the first and second rotation axes. The two orthogonal degrees of freedom may allow angulation in any plane. However, gimbal joint 10 may prevent the fluid conduits from moving axially, or along the direction of fluid flow, relative to one another.

Gimbal joint 10 may be adjustable from a neutral position in which fluid flow path 19 is defined as linear by envelope portion 12. Pivotal rotation of first rim 18 and/or second rim 20 by angulation or deflection of attached fluid conduits 21 may cause envelope portion 12 to define fluid flow path 19 as non-linear.

Examples, Components, and Alternatives

The following sections describe selected aspects of exemplary gimbal joints as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Gimbal Joint

Figure 2:
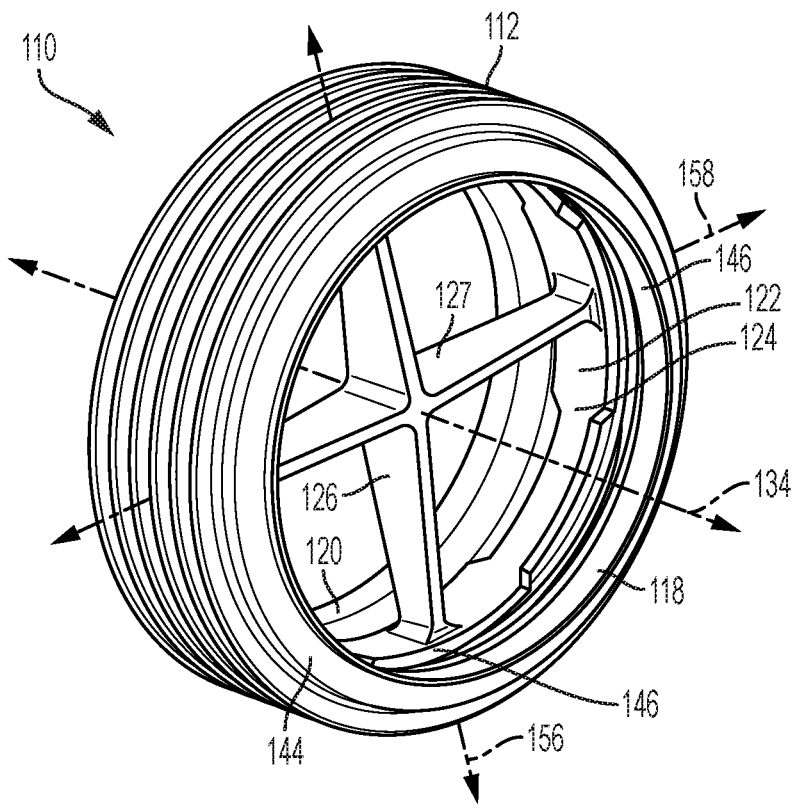
FIG. 2 is an isometric view of an illustrative gimbal joint in accordance with aspects of the present disclosure.

As shown in FIGS. 2-7, this section describes an illustrative gimbal joint 110. Gimbal joint 110 is an example of gimbal joint 10, described above. The joint may be configured for use with any fluid system, and in the present example is optimized for a system transporting rocket fuel and oxidizers such as liquid hydrogen and liquid oxygen. FIG. 2 shows an isometric view of the gimbal joint, including a bellows 112, a first rim 118, a second rim 120, and a gimbal 122.

Figure 3:
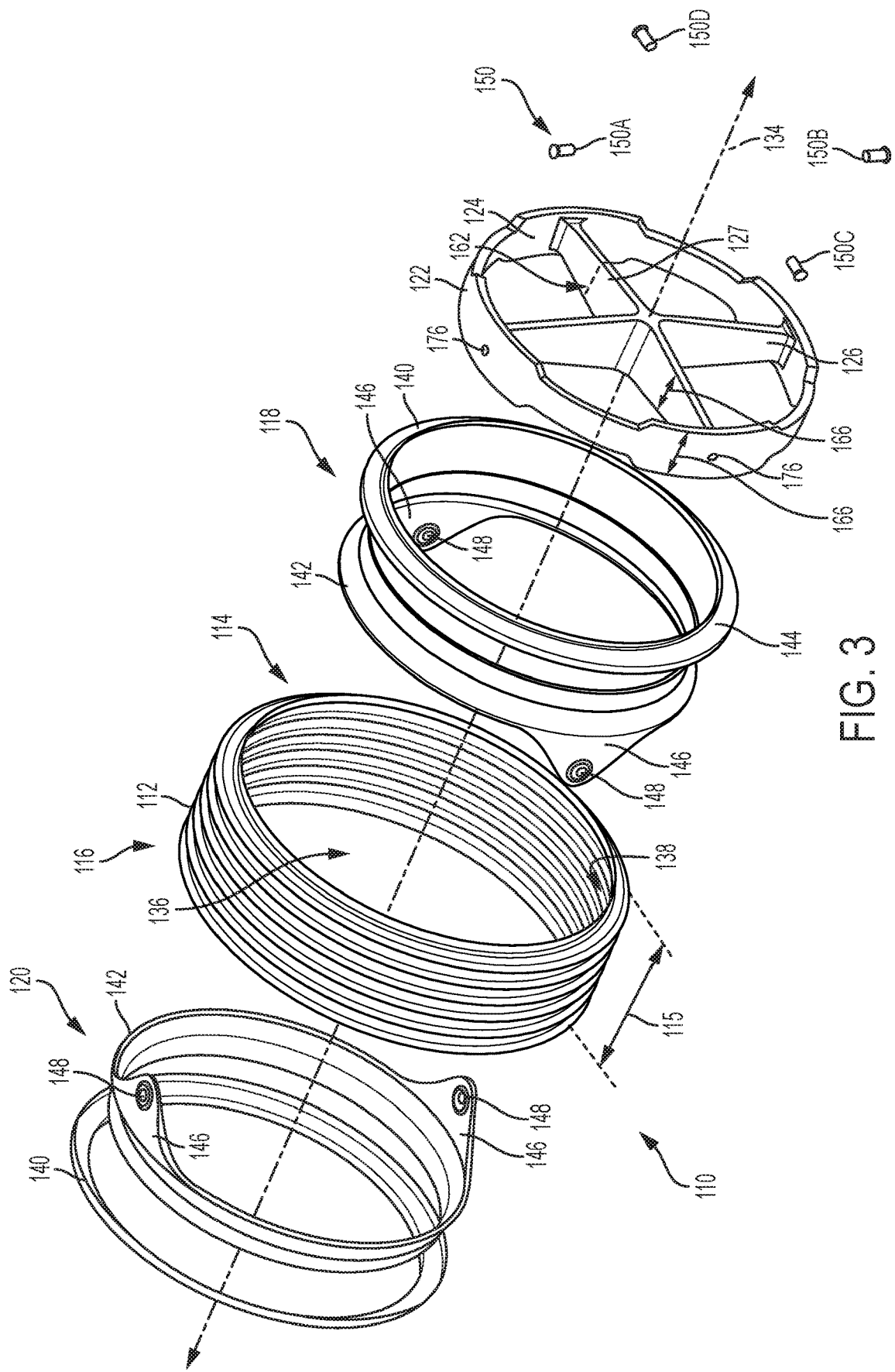
FIG. 3 is an exploded isometric view of the joint of FIG. 2.
Figure 4:
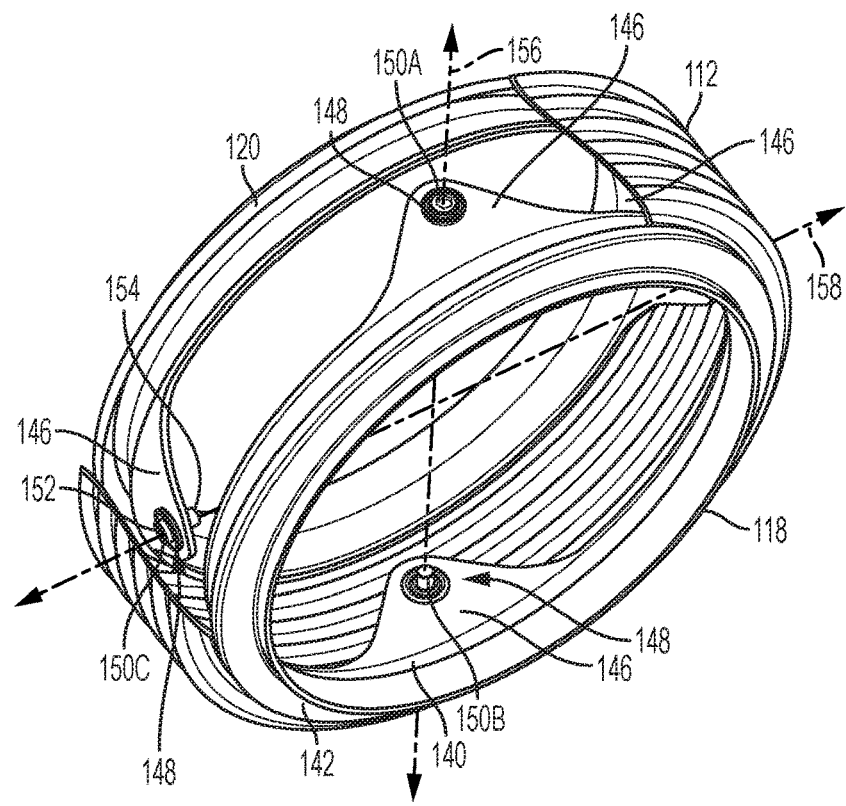
FIG. 4 is a partially cut away view of the bellows and rims of the joint of FIG. 2.

First rim 118 is fixed to a first end 114 of bellows 112, and second rim 120 is fixed to an opposing second end 116. Gimbal 122 is disposed between first rim 118 and second rim 120, inside bellows 112. In FIGS. 2-4, gimbal joint 110 is depicted in a neutral position 132, with bellows 112 fully contracted and rims 118, 120 parallel to one another. Gimbal 122 has a central axis 134, and in neutral position 132 the bellows and rims are also centered on the central axis. Central axis 134 may coincide with a direction of fluid flow through gimbal joint 110.

FIG. 3 is an exploded view of gimbal joint 110, showing the components of the joint more clearly. Bellows 112 is a tube, or cylindrical shell of corrugated material having an open interior volume 136. The corrugations of the bellows may define an outer diameter and an inner diameter of bellows 112 at upper and lower, or outer and inner, peaks. In other words, bellows 112 may be described as having a cylindrical inner surface 138 approximately defined by the inner peaks of the corrugations. Interior volume 136 may be bounded by inner surface 138, first end 114, and second end 116.

The bellows may include any number of plies, which may have a thickness between 5 thousandths of an inch (mil) and 16 mil, and/or any appropriate thickness. The corrugated material may be metal, or any other appropriate material. In the present example, bellows 112 is made of three 14 mil plies of a nickel-chromium super alloy. For instance, Inconel 718 or 625 may be used. Such a composition may provide the angulation, pressure resistance, temperature tolerance, and corrosion resistance needed for transportation of liquid oxygen under pressure.

Bellows 112 may also be of a size appropriate to the intended fluid system. The depicted bellows has an inner diameter of 8 inches, and in the present example may also be 12 inches or 16 inches in diameter. For another example, in an industrial airduct system bellows 112 may have an inner dimension between 3 and 4 feet. Bellows 112 also has a variable length 115, defined between first end 114 and second end 116. Length 115 may have a consistent value around the circumference of bellows 112 when gimbal joint 110 is in neutral position 132. Under angulation, length 115 may vary around the bellows. Other dimensions of bellows 112 such as the corrugation width and corrugation height may be selected to provide desired properties such as flexibility and/or pressure thrust absorption.

At first end 114 and second end 116, bellows 112 may include an extended flat section to facilitate welding of first rim 118 and second rim 120. The first rim includes an inner flange 140, which is disposed inside bellows 112, and an outer flange 142, which is disposed outside the bellows. The inner flange and outer flange may be separate pieces welded or otherwise fixed together, or first rim 118 may comprise a single piece. First rim 118 may include any appropriate material or materials and made be made by any effective process. In the present example, the first rim is machined Inconel 718 or 625. Other corrosion-resistant nickel-chromium super alloys may also be particularly suited to liquid oxygen or liquid hydrogen applications. In some examples, the first rim may include an inexpensive alloy of desirable flexibility and strength with an anti-corrosive coating.

Outer flange 142 is configured for connection of a fluid conduit. In the present example, the outer flange includes a planar annular surface 144 to which a metal pipe may be welded. In some examples, the outer flange may include threads, a gasket, fastener apertures, and/or any features configured to facilitate connection of a conduit. Outer flange 142 may be disposed radially outside interior volume 136 of bellows 112, outside any fluid flow path. In the present example outer flange 142 varies in diameter, with a smallest inner diameter that is smaller than the inner diameter of bellows 112. The outer flange therefore defines a restricted opening for fluid flow that corresponds to an inner radius of gimbal 122, discussed further below.

Inner flange 140 is configured for connection with gimbal 122. Generally corresponding to inner surface 138 of bellows 112, the inner flange is substantially cylindrical with a varying diameter. A pair of tabs 146 extend away from outer flange 142, along inner surface 138. The tabs are disposed diametrically opposite, or across from one another. Each tab 146 may be proximate inner surface 138, but spaced from the inner surface.

Each tab 146 includes an aperture 148, spaced from outer flange 142. The tabs may be shaped to contribute minimal weight, while providing sufficient support for apertures 148. In the present example, tabs 146 are approximately bell-curved in shape. In some examples, tabs 146 may be asymmetrical, may include cut-outs and/or may have any appropriate shape. In the present example, apertures 148 are un-threaded and each sized to receive a shear pin 150.

Second rim 120 matches first rim 118, and may also be described as above. The two rims are oriented with tabs 146 extending toward one another, but with second rim 120 rotated 90 degrees relative to first rim 118 about central axis 134. FIG. 3 is an isometric view of first rim 118 and second rim 120 fixed to bellows 112, with the bellows shown as partially cut away. Bellows 112, first rim 118 and second rim 120 may described as forming a cylindrical envelope, with a variable length between the two rims.

Four shear pins 150 are also shown in place, each pin extending through a respective aperture 148. In the present example, each shear pin 150 is a bolt with a head 152 and a partially threaded shaft 154. Head 152 of each shear pin 150 is disposed between inner surface 138 of bellows 112 and tab 146 of the respective rim 118 or 120. Head 152 may be proximate inner surface 138 without contacting the inner surface. Additionally or alternatively, other fasteners may be used.

The four shear pins 150 include a first pair of shear pins 150A and 150B and a second pair of shear pins 150C and 150D. Shear pins 150A and 150B extend through apertures 148 of first rim 118, defining a first rotational axis 156. Shear pins 150C and 150D extend through apertures 148 of second rim 120, defining a second rotational axis 158. First rim 118 is orientated relative to second rim 120 such that first rotational axis 156 is perpendicular to second rotational axis 158.

Tabs 146 of rims 118 and 120 are dimensioned such that when the rims are fixed to bellows 112, apertures 148 define a plane bisecting bellows 112. In other words, tabs 146 extend into interior volume 136 of bellows 112 such that all four apertures 148 lie on a circle. Apertures 148 may be described as disposed at 0, 90, 180, and 270 degree positions around this circle. The apertures may also be disposed in any configuration facilitating desired motion. For example, apertures 148 of first rim 118 may be spaced from apertures 148 of second rim 120 along length 115 of bellows 112.

Referring again to FIG. 3, gimbal 122 includes a ring portion 124, a first spoke 126, and a second spoke 127. The gimbal may also be described as having four arms. In some examples, gimbal 122 may include one spoke, three spokes, and/or any structure having equivalent load carrying functionality. In the present example, the two spokes provide a desired balance between load capacity, weight, and flow obstruction.

Gimbal 122 may include any appropriate material or materials and made be made by any effective process. In the present example, the gimbal is a single solid piece of machined Inconel 718 or 625. As noted above, other corrosion-resistant nickel-chromium super alloys may be similarly suited to the present fluid system. In some examples, portions of the gimbal may be hollow, include a reinforcing core material, and/or include separate components fastened together.

Ring portion 124 of gimbal 122 is a cylindrical shell, with a circular cross-sectional shape. The ring portion defines central axis 134 of gimbal 122. In neutral position 132, rims 118, 120, and bellows 112 are coaxial about the central axis. Bellows 112 and ring portion 124 are also concentric in the neutral position.

Figure 5:
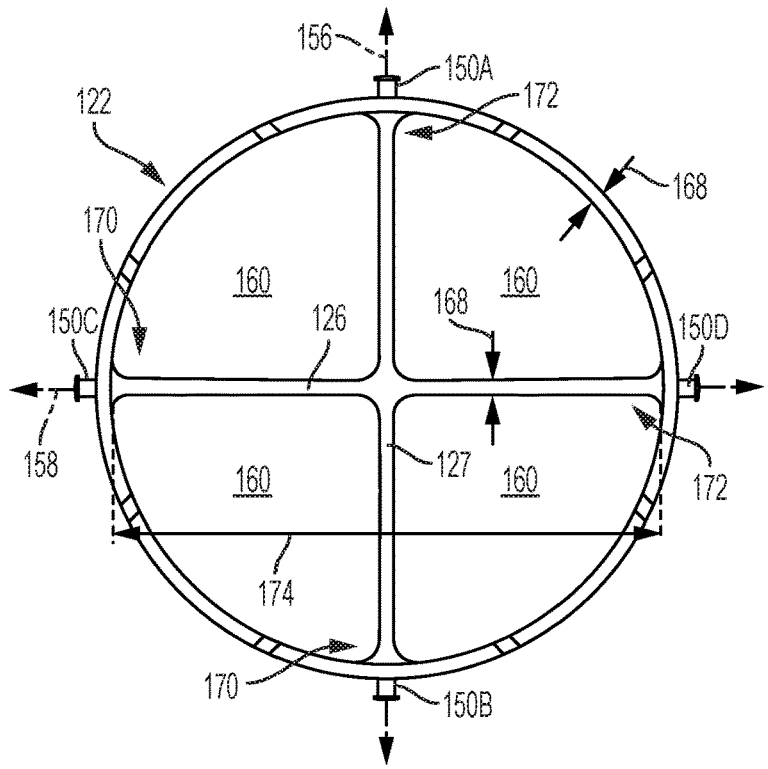
FIG. 5 is a front view of the gimbal ring of the joint of FIG. 2.

Ring portion 124 may be described as having an axial width 166 and a radial thickness 168, as shown in FIGS. 3 and 5 respectively. In the present example, the radial thickness is consistent around the ring portion, while the axial width varies. Ring portion 124 may have any structurally appropriate shape, and in particular may be shaped according to load paths determined by locations of connections to rims 118, 120 and of spokes 126, 127.

An inner diameter of ring portion 124 may correspond to a smallest inner diameter of rims 118, 120, to define a consistent fluid flow path through the gimbal joint. An outer diameter of the ring portion may be slightly less than a distance between tabs 146 of first rim 118 and/or tabs 146 of second rim 120. In other words, the ring portion may fit closely within the tabs of the two rims. The ring portion may be spaced from and/or may not contact any part of first rim 118, second rim 120, and bellows 112, in order to allow free rotational motion.

As can be seen more clearly in FIG. 5, spokes 126 and 127 bisect ring portion 124, and are perpendicular to one another. Spokes 126 and 127 intersect or cross at the center of ring portion 124, coinciding with central axis 134. Such a placement may provide an advantageous reinforcement of ring portion 124, but any effective arrangement of spokes may be used. For example, a gimbal joint may be configured for non-symmetrical loads. In such a joint, spoke 126 may bisect ring portion 124, while spoke 127 lies on a chord of the ring portion but does not intersect central axis 134.

Each spoke may be described as having a height or axial width 166, shown in FIG. 3, and a thickness 168, shown in FIG. 5. Each spoke has a first end 170 and a second end 172, with a length 174 of the spoke being defined between the two ends. Additionally, each spoke may also be described as having a cross-sectional area 162 perpendicular to length 174, generally indicated in FIG. 3. In the present example, cross-sectional are 162 is generally rectangular, defined by axial width 166 and thickness 168. The spokes may also have other cross-sectional shapes, including rounded, airfoil, and/or with a leading edge designed to reduce drag on fluid flowing through the gimbal joint.

Each spoke 126, 127 is connected to an inner surface of ring portion 124 at first end 170 and second end 172. The connections may be beveled and/or chamfered for strength and/or to prevent a weak point in the load path. Axial width 166 of ring portion 124 is also greater proximate the spoke connections, thereby strengthening those sections of the ring portion subject to the greatest loads. In some examples, axial width 166 of the ring portion may additional or alternatively have a greater value proximate connections of gimbal 122 to first rim 118 and second rim 120. Reinforcement from spokes 126 and 127 may allow the width and thickness of ring portion 124 to be minimized overall, in turn minimizing weight and size of gimbal joint 110.

Spokes 126 and 127 are configured to carry the predominantly axial loads on gimbal joint 110. Therefore, axial width 166 may be of much greater importance to the load capacity of the spokes than thickness 168. Accordingly, axial width 166 may be greater than thickness 168. Limiting thickness 168 in such a way may reduce material required to achieve a desired spoke strength. In the present example axial width 166 is more than twice thickness 168, which provides an effective balance of spoke strength and material.

Additionally, axial width 166 of each spoke is generally parallel a direction of fluid flow through the gimbal joint, while thickness 168 is generally perpendicular the flow direction. Therefore, axial width 166 may be increased without direct impact to fluid flow, while limiting thickness 168 may reduce obstruction of fluid flow through gimbal 122. The effective cross-sectional area of gimbal 122 for fluid flow may be four internal spaces 160 defined between spokes 126, 127, and ring portion 124. Thickness 168 of both spokes 126, 127 and ring portion 124 may be limited to maximize the area of internal spaces 160. The spokes and/or ring portion may also be shaped such that internal spaces 160 promote desirable fluid flow dynamics in the gimbal joint. For instance, the spaces may be shaped to reduce turbulence.

First spoke 126 and second spoke 127 may function analogously to linked cantilever beams, with loads concentrated at the central intersection of the spokes. Accordingly, axial width 166 of each spoke is greatest proximate central axis 134 and tapers symmetrically to a least value proximate first end 170 and second end 172. The tapered shape of spoke 126 can be seen more clearly in FIGS. 6-7. In examples where spokes 126, 127 are differently disposed and/or distribute loads differently, axial width 166 may be greatest proximate any point of load concentration. The intersection of spokes 126 and 127 is also chamfered, to reinforce the connection.

In FIG. 5, shear pins 150 are shown received in gimbal 122. Each of the four shear pins is received in a threaded aperture 176, which can be seen in FIGS. 3 and 6-7. As shown in FIG. 5, the apertures and received shear pins are positioned at 90 degree intervals around ring portion 124. In the present example, each aperture is proximate the connection of a first or second end 170, 172 of either first spoke 126 or second spoke 127. As a result of such positioning of shear pins 150 and thus the rotational axes defined by the shear pins, first spoke 126 is colinear with first rotational axis 156 and second spoke 127 is colinear with second rotational axis 158.

In some examples, apertures 176 and shear pins 150 may be positioned at other points on ring portion 124, such that spokes 126, 127 form non-zero angles with rotational axes 156, 158. In the present example, aligning the spokes with the rotational axes provides an effective load path, allowing minimization of the dimension and weight of the spokes.

Figure 6:
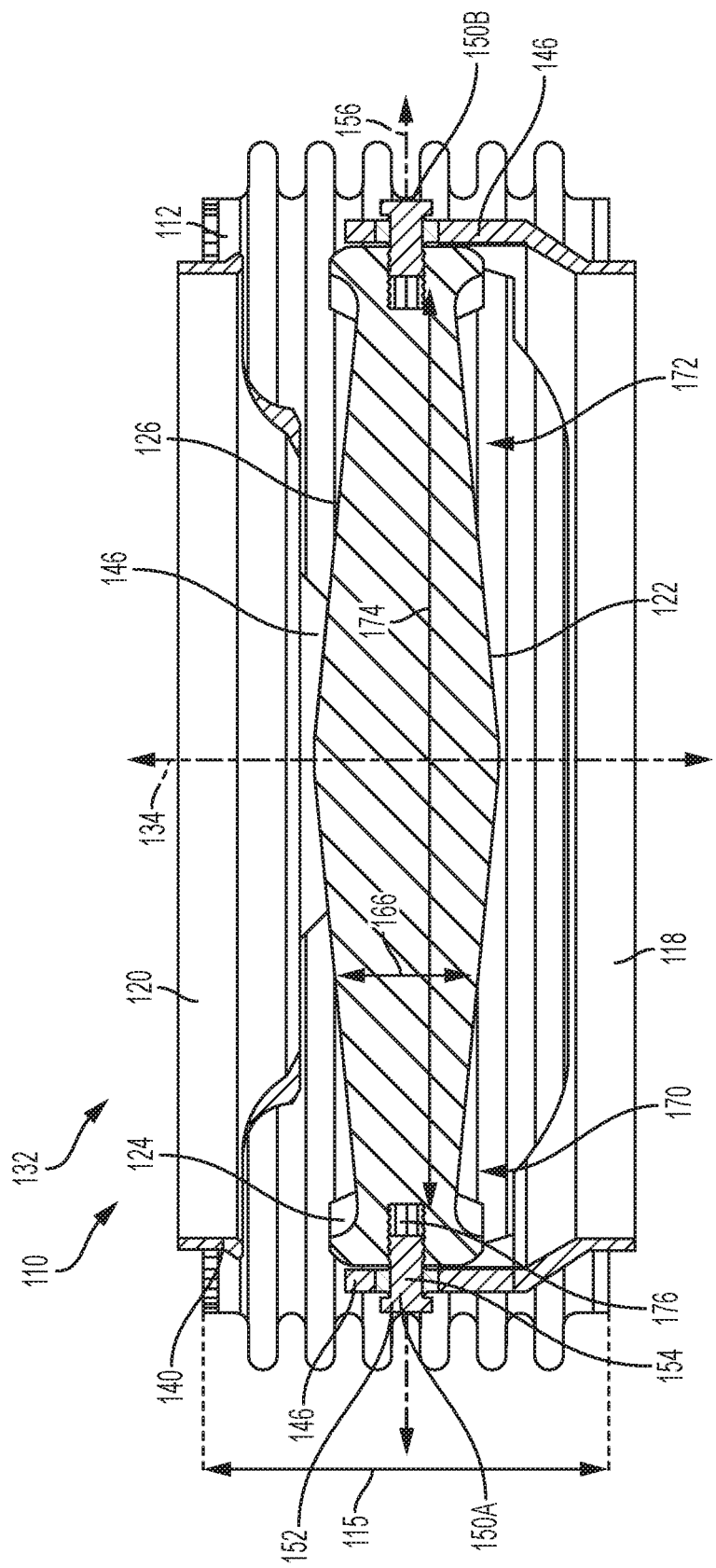
FIG. 6 is a cross-sectional view of the joint of FIG. 2 along line 6-6.

FIG. 6 is a cross-section of gimbal joint 110 along line 6-6 in FIG. 2, showing shear pins 150A and 150B fastening gimbal 122 to first rim 118. Shear pins 150C and 150D are not shown, but similarly fasten the gimbal to second rim 120.

A proximal threaded portion of shaft 154 of each shear pin 150A, 150B engages one of threaded apertures 176 of gimbal 122, thereby fixing the shear pin relative to the gimbal. Each aperture 176 extends through ring portion 124 of gimbal 122 into first spoke 126, which may reinforce the connection. The threaded portion of shaft 154 is entirely received in aperture 176, while a distal un-threaded portion remains exterior to the aperture. The un-threaded portion of the shaft of each shear pin extends through aperture 148 of one of tabs 146 of first rim 118. Head 152 of each shear pin remains on an exterior side of the first rim, opposite gimbal 122. Each shear pin 150A, 150B thereby pivotably engages first rim 118.

Figure 7:
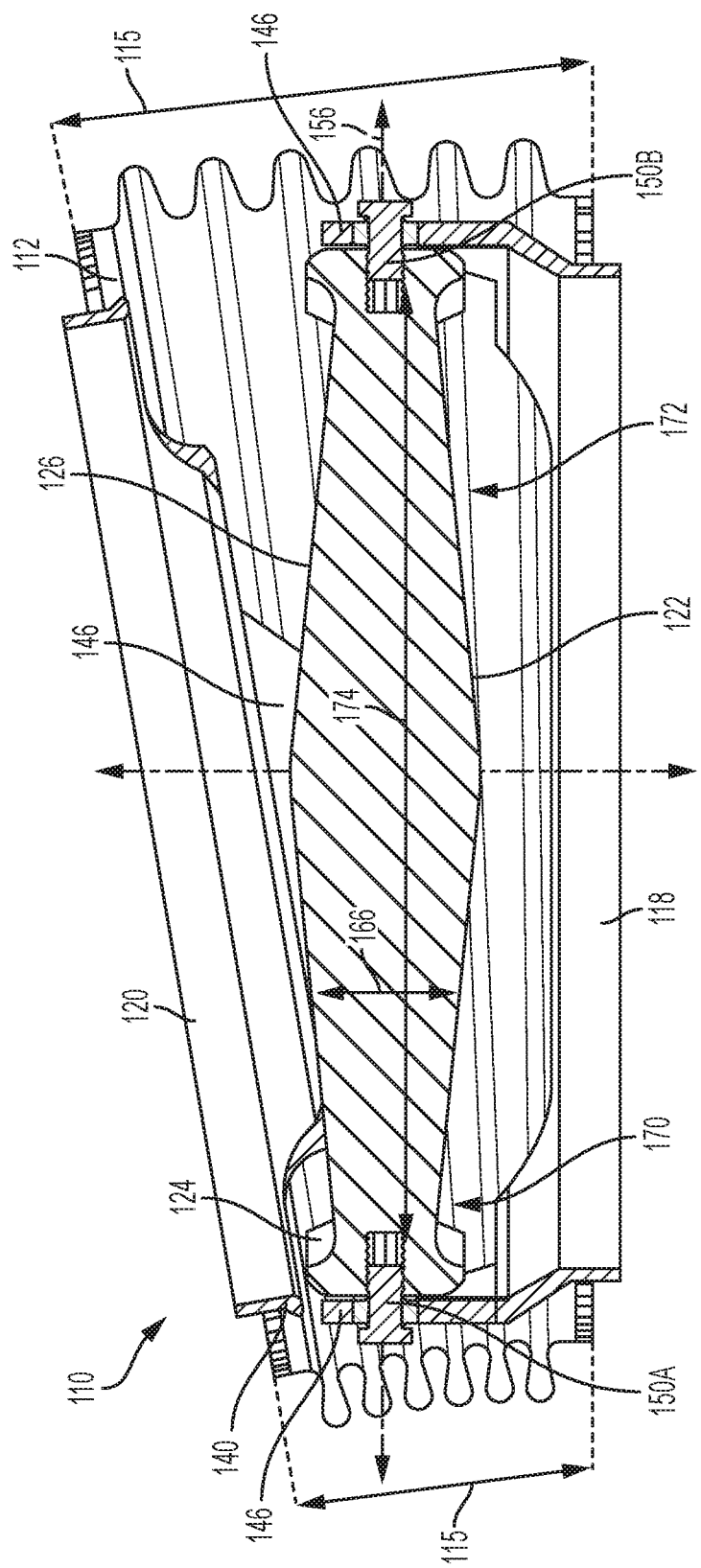
FIG. 7 is a cross-sectional view of the joint of FIG. 2 along line 6-6, with the first rim rotated relative to the second rim.

FIG. 6 depicts gimbal joint 110 in neutral position 132, and FIG. 7 depicts an allowed motion of second rim 120. The motion may be described as angulation, deflection, pivoting, and/or rotation. The second rim is depicted as pivoted relative to both gimbal 122 and first rim 118, about second rotation axis 158 on shear pins 150C and 150D (see FIG. 4). Bellows 112 is flexed to accommodate the motion of second rim 120, stretching on one side and contracting on another. That is, length 115 of the bellows has increased proximate second end 172 of first spoke 126 and decreased proximate first end 170 of the first spoke. In this position, the rims and bellows may define a non-linear flow path for fluid passing through gimbal joint 110.

Second rim 120 has an allowed range of motion, limited by contact with first rim 118. As can be seen in FIG. 7, additional pivoting of the second rim may be prevented by contact between inner flange 140 of the second rim and tab 146 of the first rim. The second rim may pivot between contact with a tab proximate second end 172 of first spoke 126 and contact with a tab proximate first end 170 of first spoke 127. This allowed range of motion may result in an effective range of angulation for conduits connected to gimbal joint 110. Axial dimensions of rims 118, 120 and bellows 112 may be selected to provide a desired effective range of angulation.

First rim 118 may pivot similarly relative to both gimbal 122 and second rim 120, about first rotation axis 156 on shear pins 150A and 150B. The first and second rims may pivot simultaneously and/or sequentially. In some situations, one rim may be fixed in space. For example, second rim 120 may be connected to a stationary conduit. Gimbal joint 110 may still pivot about both rotational axes 156, 158. That is, first rim 118 may pivot about first rotational axis 156 and gimbal 122 may pivot about second rotational axis 158 relative to fixed second rim 120. Gimbal joint 110 may thereby allow angulation of attached conduits in any plane, within the effective range.

B. Illustrative Method

Figure 8:
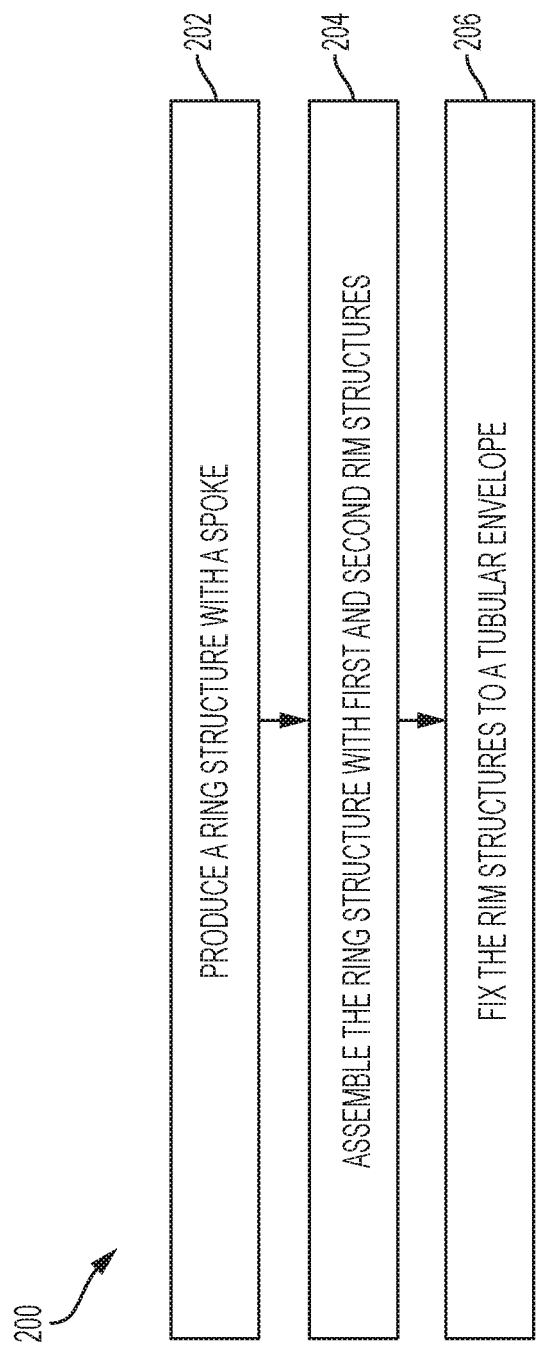
FIG. 8 is a flow chart depicting steps of an illustrative method for manufacturing a gimbal joint according to the present teachings.

This section describes steps of an illustrative method for manufacturing a gimbal joint; see FIG. 8. Aspects of joints described above may be utilized in the method steps described below. Where appropriate, reference may be made to components and systems that may be used in carrying out each step. These references are for illustration, and are not intended to limit the possible ways of carrying out any particular step of the method.

FIG. 8 is a flowchart illustrating steps performed in an illustrative method, and may not recite the complete process or all steps of the method. Although various steps of method 200 are described below and depicted in FIG. 8, the steps need not necessarily all be performed, and in some cases may be performed simultaneously or in a different order than the order shown.

At step 202, the method includes producing a ring structure with a spoke. The ring structure may be a rigid cylindrical shell, and may be bisected by the spoke. The ring structure may further include one or more additional spokes, and/or other reinforcing structures. The ring structure may be a gimbal structure 22 and/or a gimbal 122 as described above. Four threaded apertures may extend radially into the ring structure from an exterior surface, and may be spaced at 90 degree intervals around the circumference of the ring. The spoke may span between an opposing pair of the apertures, and a second, orthogonal spoke may span between the other pair of apertures.

Producing the ring structure may include machining a solid block of metal or metal alloy such as a nickel chromium super alloy. Producing the ring structure may also include 3-D printing, casting, drilling apertures, fastening, and/or any effective method or combination of methods in any desirable material.

Step 204 includes assembling the ring structure with first and second rim structures. The rim structures may be rims 18, 20 and/or rims 118, 120 as described above. Each rim structure may include first and second opposing portions, and the assembling step may include pivotably connecting the ring structure to the first and second opposing portions of the first rim structure and to the first and second opposing portions of the second rim structure.

In some examples, the first and second opposing portions of each rim structure may be tabs extending from a cylindrical flange. Each tab may include an un-threaded aperture, and the assembly step may include inserting a bolt through each aperture. Each bolt may further be inserted into a corresponding threaded aperture in the ring structure, thereby pivotably connecting the first and second rims to the ring structure.

Step 206 includes fixing the rim structures to an expandable tubular envelope. In order to fix the rim structures in the correct orientation and position relative to the tubular envelope, the step may include positioning the ring structure inside the tubular envelope, with each rim structure also partially or entirely inside the envelope. Fixing the rim structures may be performed using a method appropriate to the materials of the rim structures and the envelope. For example, fixing may include sewing plastic rims to a fabric envelope, or may include welding metal rims to a metal bellows.

In some examples, steps 204 and 206 may be performed in reverse order. That is, the rim structures may be fixed to the expandable tubular envelope prior to assembly with the ring structure. In some examples the rim structures may be manufactured as part of the expandable tubular envelope, and step 206 may be omitted. In some examples, method 200 may further include connecting the first and second rim structures to conduits and/or conduit sections of a fluid system. For example, the method may include welding a metal pipe to each of the rim structures.

C. Illustrative Combinations and Additional Examples

This section describes additional aspects and features of gimbal joints, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A gimbal apparatus, comprising:
a tubular envelope having a variable length between first and second rim structures,
a rigid ring structure inside the tubular envelope, the ring structure being connected to diametrically opposite first and second portions of the first rim structure, and connected to diametrically opposite first and second portions of the second rim structure, and
a first spoke bisecting the ring structure.

A1. The gimbal apparatus of A0, further comprising:
a second spoke bisecting the ring structure orthogonal to the first spoke.

A2. The gimbal apparatus of A1, wherein the first spoke spans the first and second portions of the first rim structure, and the second spoke spans the first and second portions of the second rim structure.

A3. The gimbal apparatus of A1 or A2, wherein the tubular envelope defines a fluid flow path, wherein each of the spokes has a cross-section including an elongate axis parallel to the direction of fluid flow.

A4. The gimbal apparatus of any of A1-A3, wherein each spoke diminishes in dimension radially outward from the center of the ring structure.

A5. The gimbal apparatus of any of A0-A4, wherein a first axis spanning the first and second portions of the first rim structure is orthogonal to a second axis spanning the first and second portions of the second rim structure.

A6. The gimbal apparatus of A5, wherein the first spoke is collinear with the first axis.

A7. The gimbal apparatus of A5 or A6, wherein the second rim structure can be pivotally rotated around the first axis relative to the first rim structure causing the tubular envelope to define an adjustable nonlinear fluid flow path.

A8. The gimbal apparatus of any of A0-A7, wherein the tubular envelope is cylindrical.

A9. The gimbal apparatus of any of A0-A8, wherein the tubular envelope includes bellows.

B0. A gimbal joint, comprising:
a flexible envelope portion having a first end and a second end and configured to direct a flow of fluid,
a first rim fixed to the first end of the envelope portion,
a second rim fixed to the second end of the envelope portion, and
a gimbal structure including a ring and a spoke, the spoke bisecting the ring, wherein the ring is rotatably coupled to the first rim by first and second opposing fasteners and the ring is rotatably coupled to the second rim by third and fourth opposing fasteners.

B1. The gimbal joint of B0, wherein the spoke is a first spoke and the gimbal structure includes a second spoke, the first and second spokes being orthogonal.

B2. The gimbal joint of B1, wherein the first spoke, the second spoke, and the ring are a single piece.

B3. The gimbal joint of B2, wherein the first and second spokes intersect and are joined proximate a central axis of the ring.

B4. The gimbal joint of any of B1-B3, wherein each of the first, second, third, and fourth fasteners is disposed proximate a respective end of the first or second spoke.

B5. The gimbal joint of any of B0-B4, wherein the spoke has a height parallel a central axis of the ring, a radial length, and a thickness, the thickness of the spoke being less than half the height of the spoke.

B6. The gimbal joint of B5, wherein the height of the spoke tapers from the central axis of the ring to each end of the spoke.

B7. The gimbal joint of any of B0-B6, wherein the ring is a cylindrical shell having a height parallel a central axis, the height varying around a circumference of the ring such that the height is greatest proximate each end of the spoke.

B8. The gimbal joint of any of B0-B7, wherein the flexible envelope portion is a bellows.

B9. The gimbal joint of any of B0-B8, wherein the each of the first rim and the second rim includes an outer surface configured for connection to a fluid conduit.

B10. The gimbal joint of B9, wherein each of the first rim and the second rim includes an inner flange configured for connection to the gimbal structure.

B11. The gimbal joint of any of B0-B10, wherein the first rim is rotatable about a first axis defined by the first and second fasteners, and the second rim is rotatable about a second axis defined by the third and fourth fasteners, the first and second axes being orthogonal.

B12. The gimbal joint of any of B0-B11, wherein each of the first, second, third, and fourth fasteners is a bolt threadedly engaged with the gimbal structure, a head of the bolt being disposed between the envelope portion and the first or second rim.

C0. A feedline for an engine, comprising:
a conduit having a joint, the joint including a tubular envelope having a variable length between first and second rim structures, a rigid ring structure inside the tubular envelope, the ring structure being connected to the first and second rim structures, and including a plurality of spokes.

C1. The feedline of C0, wherein the ring structure and spokes form a single unitary structure.

C2. The feedline of C0, wherein the joint is (a) the gimbal apparatus of any of A0-A9 or (b) the gimbal joint of any of B0-B12.

D0. A method of manufacturing a gimbal joint, comprising:
producing a rigid ring structure including a bisecting spoke;
assembling the ring structure with first and second rim structures, such that the ring structure is connected to diametrically opposite first and second portions of the first rim structure, and connected to diametrically opposite first and second portions of the second rim structure;
positioning the ring structure inside a tubular envelope having a first end and a second end;
fixing the first rim structure to the first end of the tubular envelope;
fixing the second rim structure to the second end of the tubular envelope.

D1. The method of D0, wherein the producing step includes machining the ring structure from a solid piece of metal.

D2. The method of D1, wherein the metal is a nickel chromium super alloy.

D3. The method of any of D0-D2, wherein the assembling step includes fastening the ring structure to the first and second portions of the first rim structure, and to the first and second portions of the second rim structure.

D4. The method of any of D0-D3, wherein the assembling step includes inserting a bolt through an aperture in each of the first and second portions of the first rim structure and the first and second portions of the second rim structure, and threading each bolt into a corresponding aperture of the ring structure.

D5. The method of any of D0-D4, wherein the tubular envelope includes metal bellows and the fixing steps include welding the first and second rim structures to the tubular envelope.

D6. The method of any of D0-D5, wherein the gimbal joint manufactured is (a) the gimbal apparatus of any of A0-A9 or (b) the gimbal joint of any of B0-B12.

Advantages, Features, and Benefits

The different embodiments and examples of the gimbal joints described herein provide several advantages over known solutions for connecting fluid conduits. For example, illustrative embodiments and examples described herein provide a strong and light-weight expansion joint with angulation in two axes.

Additionally, and among other benefits, illustrative embodiments and examples described herein are straightforward to assemble and require limited welding.

Additionally, and among other benefits, illustrative embodiments and examples described herein accommodate loads with a mass-efficient structure.

Additionally, and among other benefits, illustrative embodiments and examples described herein allow a small envelope while limiting flow obstruction.

No known system or device can perform these functions, particularly in the extreme temperatures and corrosivity of a liquid oxygen environment. Thus, the illustrative embodiments and examples described herein are particularly useful for rocket fuel lines. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A gimbal apparatus, comprising:
    a tubular envelope having a variable length between first and second rim structures,
    a rigid ring structure inside the tubular envelope, the ring structure being connected to diametrically opposite first and second portions of the first rim structure, and connected to diametrically opposite first and second portions of the second rim structure, and
    a first spoke bisecting the ring structure,
   wherein the ring structure is a cylindrical shell having a height parallel a central axis, the height varying around a circumference of the ring structure such that the height is greatest proximate each end of the first spoke.

2. The gimbal apparatus of claim 1, further comprising:
    a second spoke bisecting the ring structure orthogonal to the first spoke.

3. The gimbal apparatus of claim 2, wherein the first spoke spans the first and second portions of the first rim structure, and the second spoke spans the first and second portions of the second rim structure.

4. The gimbal apparatus of claim 2, wherein the tubular envelope defines a fluid flow path, wherein each of the spokes has a cross-section including an elongate axis parallel to the direction of fluid flow.

5. The gimbal apparatus of claim 2, wherein each spoke diminishes in dimension radially outward from the center of the ring structure.

6. The gimbal apparatus of claim 1, wherein a first axis spanning the first and second portions of the first rim structure is orthogonal to a second axis spanning the first and second portions of the second rim structure.

7. The gimbal apparatus of claim 6, wherein the first spoke is collinear with the first axis.

8. The gimbal apparatus of claim 6, wherein the second rim structure can be pivotally rotated around the first axis relative to the first rim structure causing the tubular envelope to define an adjustable nonlinear fluid flow path.

9. The gimbal apparatus of claim 1, wherein the tubular envelope includes bellows.

10. The gimbal apparatus of claim 1, wherein the rigid ring structure is inside the first and second rim structures.

11. A gimbal joint, comprising:
    a flexible envelope portion having a first end and a second end and configured to direct a flow of fluid,
    a first rim fixed to the first end of the envelope portion,
    a second rim fixed to the second end of the envelope portion, and
    a gimbal structure including a ring and a spoke, the spoke bisecting the ring,
   wherein the ring is rotatably coupled to the first rim by first and second opposing fasteners and the ring is rotatably coupled to the second rim by third and fourth opposing fasteners,
   wherein the ring is a cylindrical shell having a height parallel a central axis, the height varying around a circumference of the ring such that the height is greatest proximate each end of the spoke.

12. The gimbal joint of claim 11, wherein the spoke is a first spoke and the gimbal structure includes a second spoke, the first and second spokes being orthogonal.

13. The gimbal joint of claim 12, wherein the first spoke, the second spoke, and the ring are a single piece.

14. The gimbal joint of claim 11, wherein the spoke has a height parallel a central axis of the ring, a radial length, and a thickness, the thickness of the spoke being less than half the height of the spoke.

15. The gimbal joint of claim 14, wherein the height of the spoke tapers from the central axis of the ring to each end of the spoke.

16. The gimbal joint of claim 11, wherein the first rim is rotatable about a first axis defined by the first and second fasteners, and the second rim is rotatable about a second axis defined by the third and fourth fasteners, the first and second axes being orthogonal.

17. The gimbal joint of claim 11, wherein each of the first, second, third, and fourth fasteners is a bolt threadedly engaged with the gimbal structure, a head of the bolt being disposed between the envelope portion and the first or second rim.

18. A feedline for an engine, comprising:
- a conduit having a joint, the joint including a tubular envelope having a variable length between first and second rim structures,
- a rigid ring structure inside the tubular envelope, the ring structure being connected to the first and second rim structures, and including a plurality of spokes,
- wherein the ring structure and spokes form a single unitary structure,
- wherein the ring structure includes a cylindrical shell having a height parallel a central axis, the height varying around a circumference of the ring structure.

19. The feedline of claim 18, wherein the rigid ring structure consists of a solid piece of metal.

20. The feedline of claim 18, wherein each spoke has a height parallel a central axis of the ring structure, a radial length, and a thickness, the thickness of each spoke being less than half the height of the respective spoke.

* * * * *